United States Patent [19]
Lanes

[11] 3,771,123
[45] Nov. 6, 1973

[54] OPTICAL FLASHING LIGHT SIMULATOR AND ALERTING DEVICE

[76] Inventor: Albert Lanes, 207 E. 74th St., New York, N.Y. 10021

[22] Filed: Mar. 4, 1971

[21] Appl. No.: 120,883

[52] U.S. Cl.............. 340/104, 340/383, 240/1.2, 40/217, 40/106.51, 33/46.5
[51] Int. Cl.............................................. B60g 9/00
[58] Field of Search.................. 340/103, 26, 104, 340/27, 383; 35/10.2, 29 R, 25; 350/130, 131, 132, 141, 143; 240/1.2; 40/106.51, 106.42, 77, 217; 33/46.5

[56] References Cited
UNITED STATES PATENTS

| | | | |
|---|---|---|---|
| 3,543,235 | 11/1970 | Eikenberry et al. | 340/104 X |
| 3,537,066 | 10/1970 | Stingl | 340/25 |
| 3,366,923 | 1/1968 | Panerai et al. | 340/25 |
| 3,447,129 | 5/1969 | Birmingham et al. | 340/26 |
| 3,235,987 | 2/1966 | Yates | 40/106.51 |

*Primary Examiner*—John W. Caldwell
*Assistant Examiner*—William M. Wannisky
*Attorney*—Kane, Dalsimer, Kane, Sullivan & Kurucz

[57] ABSTRACT

An optical alerting device flashes only when there is relative motion between the device and an observer or sensor. The flashing rate is a function of closing rate and the distance of the observer from the device.

10 Claims, 5 Drawing Figures

PATENTED NOV 6 1973

INVENTOR
ALBERT LANES
BY
Kane, Dalsimer, Kane, Sullivan + Kurucz
ATTORNEYS

INVENTOR
ALBERT LANES
BY
Kane, Dalsimer, Kane, Sullivan + Kurucz
ATTORNEYS

OPTICAL FLASHING LIGHT SIMULATOR AND ALERTING DEVICE

The principal object of this invention is to provide a device having particular application as a motor vehicle tail or brake light, a safety flare simulator to be placed behind a broken down or roadside vehicle, a flashing light simulator at dangerous intersections or curves, or wherever there is a requirement for a flashing signal incident to relative motion between an observer and the signal. The simulator can also be used for highway, bridge and toll approach signs which will appear to flash at a rate proportional to the rate of approach of an observer.

These and other objects are most effectively attained by an optical arrangement of device which projects alternately dark and light zones or contrasting zones of a suitable color which will generate a flashing phenomenon when passing from one zone to the other.

With these and other objects in view which will more fully appear, the nature of the invention will be more clearly understood by following the description, the appended claims and the several views illustrated in the accompanying drawings in which:

Figure 1:
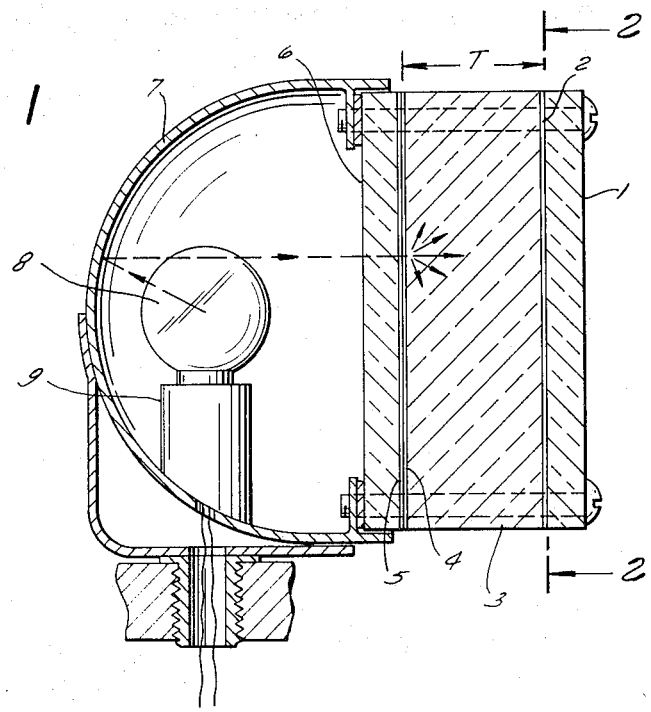
FIG. 1 is a longitudinal section showing a lamp construction in accordance with my invention.
Figure 2:
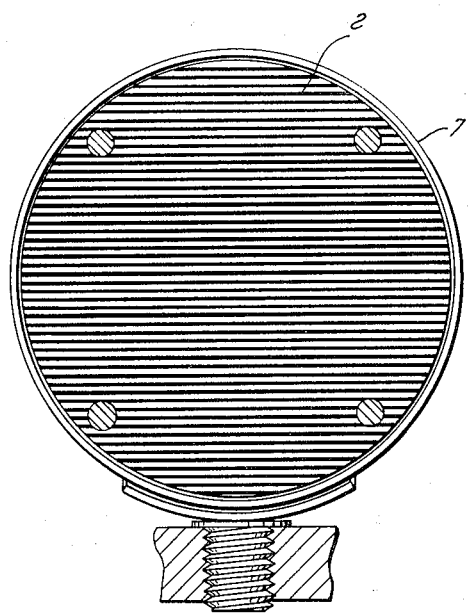
FIG. 2 is a cross-section thereof taken along line 2—2 of FIG. 1.

Referring now to the lamp construction shown in FIGS. 1 and 2, an interior light source 8 is mounted in its socket 9. The light from light source 8 is gathered and directed by reflector 7 which in this embodiment also acts as a lamp housing and main support which, for example, may have means for threaded and electrical coupling to a vehicle as shown. The light then passes through a light-transmitting plate 6 which is tinted a suitable color. The colored or tinted light then passes through a light diffuser 5 which causes the light to become omni-directional. The diffuse colored light then passes through the bar pattern 4, an exemplary embodiment of which is shown in detail in FIGS. 2 and 4. The modified light then passes through spacer 3 of selected thickness "T", and then through bar pattern 2 which is identical to and perfectly aligned with bar pattern 4. The modified light then passes through the protective cover plate 1.

Figure 5:
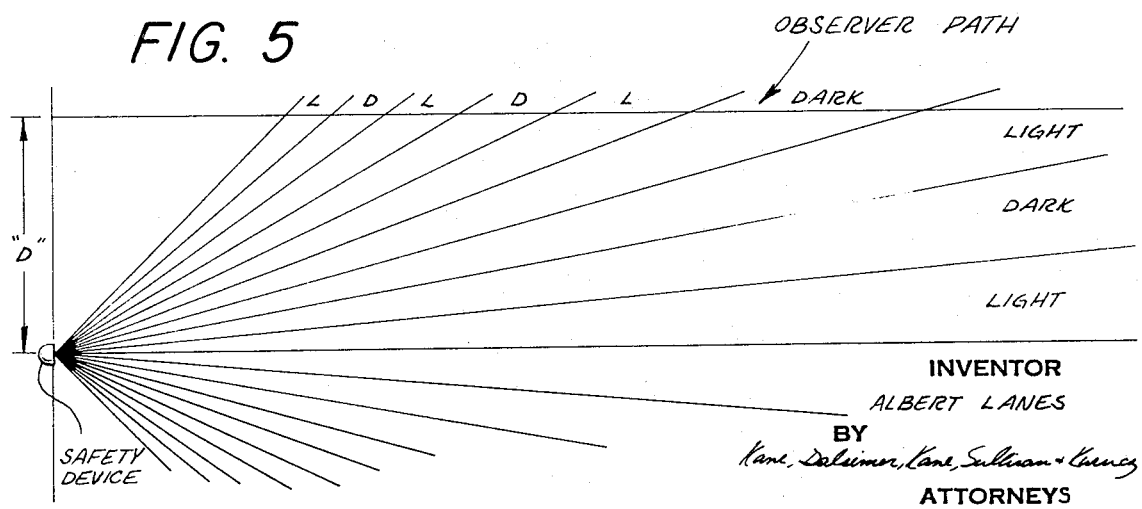
FIG. 5 is a diagrammatic view graphically depicting the relative flashing effect as the distance between the light source and observer decreases.

The light exiting the device when observed from a distance will be in horizontal dark and light zones as shown diagrammatically in FIG. 5 and designated D & L, respectively. It can be seen in this view that as the observer approaches the source along a path parallel to the source optical axis and displaced from it by distance "D", the observer passes through alternate dark and light zones which get progressively smaller. If the observer approaches the source at a constant rate, the flashing is a function of the distance from the source when displacement "D" is fixed. For some applications it may be useful for the zones to be vertical.

For a system where the bar patterns are 48 lines to the inch, and the spacer 3 is one inch thick, and the displacement "D" is 3 feet, the center of the light zones will appear at the following distance from the source ($x$) when approaching it.

| nth period   | 1        | 2   | 3  | 4  | 5  | 6  | 7  | 8  | 9  | 10 |
|--------------|----------|-----|----|----|----|----|----|----|----|----|
| x (ft.) approx. | Infinity | 144 | 48 | 36 | 29 | 24 | 21 | 18 | 16 | 14 |
| nth period   | 11       | 12  | 13 | 14 | 15 | 16 | 17 | 18 | 19 | 20 |
| x (ft.) approx. | 13    | 12  | 11 | 10 | 9½ | 9  | 8½ | 8  | 7½ | 7  |

Obviously, if the table were continued, the intervals will be progressively shorter.

The center of the first dark zone will occur at 288 feet. It will be evident from the foregoing table that the rate of flashing or flashing effect increases as the distance "$x$" decreases. This is a warning of impending concern or possible danger and is readily transmitted to the observer. If the bar pattern is increased to 96 lines per inch which is double the previous example, or if "T" the thickness of space 3 is doubled, or if "D" is doubled, the distance at which the center bright zones will occur is doubled, as well as the dark zones. This has the effect of increasing the flashing effect at all distances.

Figure 3:
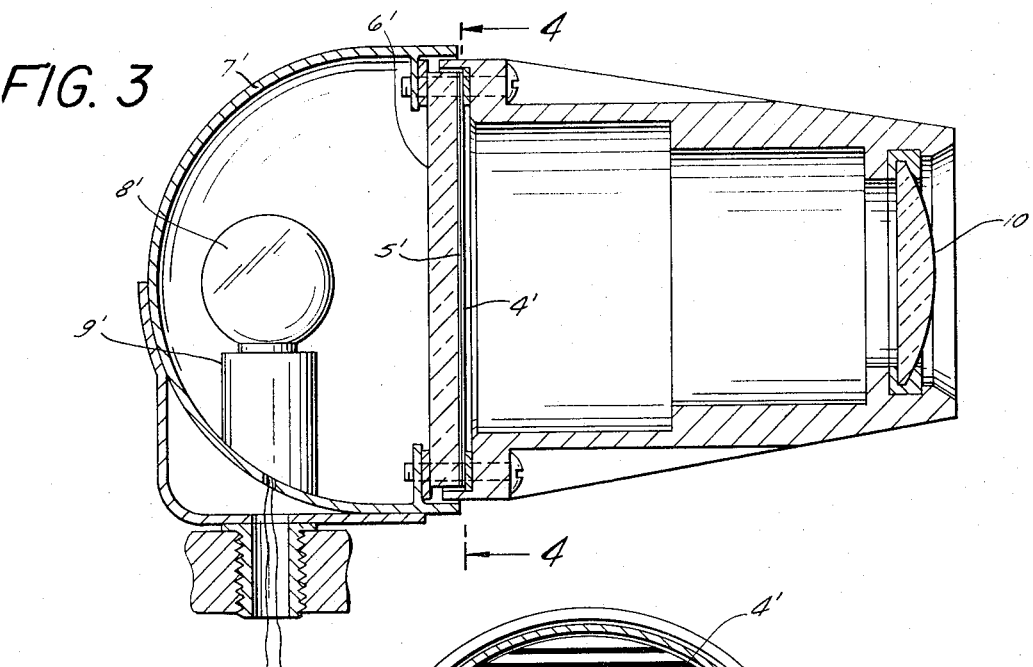
FIG. 3 is a vertical section showing an alternative lamp construction.
Figure 4:
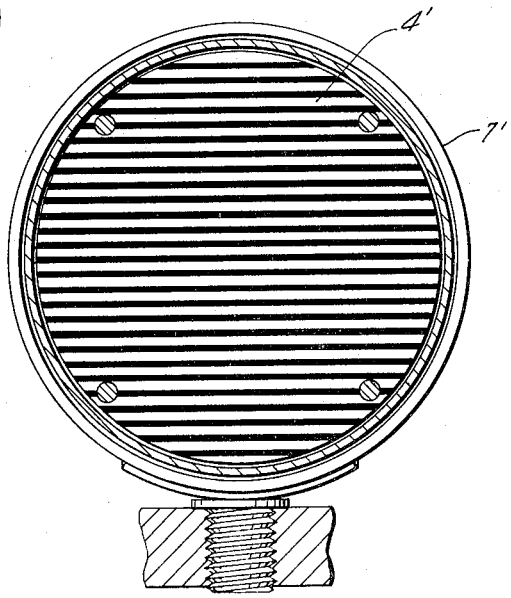
FIG. 4 is a cross-section thereof taken along the line 4—4 of FIG. 3.

An alternate construction shown in FIGS. 3 and 4 consists of light source 8' in its socket 9'. The light from light source 8' is gathered and directed by reflector 7' which also acts as a lamp housing and main support. The light then passes through a light-transmitting plate 6' which may be tinted a suitable color. The colored light then passes through a light diffuser 5' which causes the light to become omnidirectional. The light then passes through the bar pattern 4'. The bar pattern is projected by lens 10' to form light and dark zones as shown diagrammatically in FIG. 5. The bar pattern is located in the focal plane of the lens, this distance being the focal length of the lens.

The system where the bar pattern is 16 lines per inch, and the focal length of the lens is 3 inches, is equivalent to the previous construction where there was 48 lines to the inch and the spacer was 1 inch thick. Doubling the focal length will have the same effect as doubling the thickness.

The second construction has the advantage that the bar pattern does not have to be periodic. This results in greater flexibility in choosing the size of the zones, but has added expense due to the lens. In either case, the bar and the space therebetween need not be equal but is governed by brightness requirements.

In this construction, the bar patterns need not be black and white, but can be two contrasting colors, such as red and yellow. In this way the source is always visible. The flashing phenomenon will be due to passing from a yellow zone to a red zone, etc.

Naturally, other embodiments are envisioned as, for example, a lamp construction identical to the first except that the light source and diffuser is replaced by a retroreflector; or for some applications, a specular, or a diffuse reflector. This is most useful where there is no electricity available to run the light source, but requires a light source near the observer to illuminate the device, such as headlights. This is most useful for roadside safety devices in remote places where there is no electricity available, and where a maintenance-free device is required.

Some advantages of the present invention, among many others, are as follows:

There is no flashing except when there is relative motion between the safety lamp and the observer, or when there is a possibility of danger.

The flashing rate increases with closing rate and decreased distance imparting a greater sense of urgency and vice-versa. When there is no relative motion and hence no danger, there is no flashing.

The flashing occurs without any interchange of signals between the safety lamp and the observer, such as radar.

The safety lamp flashes without aid of any electronic or mechanical switching device.

The light bulb does not switch on and off but is on constantly, which is an easier operating condition which adds to the life of the bulb and reliability of the device.

Thus, by means of optical phenomenon incident to and generated between my device and any and all observers or sensors of said device, an extremely reliable flashing or pulsating safety, warning and alerting signal is provided which has many advantages and desirable characteristics. For example, there are no electronic, mechanical moving parts or switches as well as other parts capable of malfunctioning or breaking down other than a constant light source which may be supplied by ordinary light bulbs. The flashing signal or warning occurs with an apparent rate that is less when the distance between the device and the observer increases or where the rate of closing or approach is less and the observer notices a constantly increasing rate of flashing as he approaches the device so that on near approach a crescendo of urgency in the flashing rate occurs to alert the observer to the signal or warning.

The invention is immediately applicable to all types of safety devices and signs that will very substantially improve the safety in all areas of vehicular traffic including automotive, railroad and aviation; not to mention application in the advertising arts and for displays.

While many possible embodiments may be made of my invention and while many changes may be made in the constructions herein set forth, it will be understood that all matter described herein or shown in the accompanying drawings is to be interpreted as illustrative and not in any limiting sense. For instance, the light source may be an ultraviolet or infrared source which may be invisible. This would require that the observer be replaced by an optical sensor which is sensitive to the UV or IR portions of the spectrum, and would process the optical information and sound an alarm which may be audible, visual or electronic.

I claim:

1. A safety device which generates a flashing phenomenon when there is relative motion between the safety device and the observer and is only apparent to the observer comprising: a housing, a directed light source, a bar pattern supported by the housing, diffusing means for diffusing light directed to the bar pattern from the light source, projecting means for receiving and transmitting the light from said bar pattern into space and optical spacer means spacing said bar pattern from said projecting means, the projected bar pattern forming alternately contrasting dark and light zones through which an observer passed to generate the flashing phenomenon apparent to the observer, the bar pattern comprising a predetermined number of parallel relatively dark lines of predetermined width separated by contrasting relatively lighter light transmitting lines of predetermined width, the flashing rate being a function of the closing rate and distance of the observer from the device, and the geometry of the device.

2. The invention in accordance with claim 1 wherein the device includes a light source in the housing and an optical axis emanating from the light source, mounting means for cooperating with the housing in supporting the bar pattern transversely of the optical axis.

3. The invention in accordance with claim 2 wherein the housing includes connecting means for connecting the device to a vehicle.

4. The invention in accordance with claim 2 wherein the light source is an electric light bulb and an electrical socket receiving the bulb and means for coupling the socket and, consequently, the bulb to a source of electricity.

5. The invention in accordance with claim 1 wherein the device includes a light source in the housing and an optical axis emanating from the light source, mounting means for cooperating with the housing in supporting the bar pattern transversely of the optical axis, the housing includes connecting means for connecting the device to a vehicle, the light source is an electric bulb and an electrical socket receiving the bulb and means for coupling the socket and, consequently, the bulb to a source of electricity, and the bar pattern comprises a predetermined number of parallel relatively dark lines of predetermined width separated by contrasting relatively lighter light-transmitting lines of predetermined width.

6. The invention in accordance with claim 1 wherein a pair of spaced and aligned substantially identical and periodic patterns is mounted by the housing with the dark lines being at least equal in width to the lighter lines.

7. The invention in accordance with claim 1 wherein said projecting means comprises a second bar pattern.

8. The invention in accordance with claim 1 wherein said projecting means comprises an optical lens.

9. The invention in accordance with claim 1 wherein the device includes a light transmitting plate disposed between the light source and the diffusing means.

10. The invention in accordance with claim 9 wherein the light transmitting plate is tinted.

* * * * *